United States Patent [19]

Kaplin et al.

[11] Patent Number: 5,437,711
[45] Date of Patent: Aug. 1, 1995

[54] METHOD OF PURIFYING CHLORINE-CONTAINING GASES

[75] Inventors: Ronald B. Kaplin, Lewiston; Chao-Peng Chen; Tilak V. Bommaraju, both of Grand Island, all of N.Y.

[73] Assignee: Occidental Chemical Corporation, Niagara Falls, N.Y.

[21] Appl. No.: 167,294

[22] Filed: Dec. 16, 1993

[51] Int. Cl.$^6$ ............................................. B01D 53/14
[52] U.S. Cl. ........................................ 95/182; 95/233; 423/240 R; 423/245.1; 423/503
[58] Field of Search ............. 95/182, 233; 423/240 R, 423/240 S, 245.1, 503

[56] References Cited

U.S. PATENT DOCUMENTS

| | | | |
|---|---|---|---|
| 1,338,654 | 4/1920 | Henderson | 95/233 |
| 2,393,229 | 1/1946 | Bouchard | 95/233 |
| 2,540,905 | 2/1951 | Neubauer et al. | 95/182 |
| 2,765,873 | 10/1956 | Hulme | 95/182 |
| 3,052,612 | 9/1962 | Henegar et al. | 204/128 |
| 3,568,409 | 3/1971 | Ferguson et al. | 95/182 |
| 4,003,982 | 1/1977 | Hill et al. | 423/351 |
| 4,138,296 | 2/1979 | Balko et al. | 204/128 |
| 4,230,673 | 10/1980 | Balko et al. | 422/225 |
| 4,986,975 | 1/1991 | Schmidhammer et al. | 423/241 |
| 5,308,383 | 5/1994 | Rowe | 95/182 |

FOREIGN PATENT DOCUMENTS

| | | | |
|---|---|---|---|
| 866780 | 9/1941 | France . | |
| 226862 | 9/1985 | Germany | 423/503 |
| 58-208104 | 12/1983 | Japan | 423/503 |
| 62-216902 | 9/1987 | Japan | 95/233 |

Primary Examiner—Jay H. Woo
Assistant Examiner—Duane S. Smith
Attorney, Agent, or Firm—Wayne A. Jones; Richard D. Fuerle

[57] ABSTRACT

Disclosed is a method to be practiced in a gas purification apparatus that is suitable for contacting a chlorine-containing mixture of gases with carbon tetrachloride in order to remove one of the gases from the mixture. The gas removed can be either chlorine or another gas such as nitrogen trichloride. In the method of the invention, one of the gases is removed from the mixture in that apparatus without using carbon tetrachloride by contacting the chlorine-containing gas mixture in the apparatus with a chlorinated organic liquid which can either be chloroform or ethylene dichloride.

17 Claims, 5 Drawing Sheets

METHOD OF PURIFYING CHLORINE-CONTAINING GASES

BACKGROUND OF THE INVENTION

This invention relates to a method of purifying a mixture of chlorine with other gases in apparatus that is suitable for contacting the mixture with carbon tetrachloride in order to remove one of the gases from the mixture. Specifically, it relates to contacting the mixture of gases in that apparatus with either chloroform or ethylene dichloride.

In the manufacture and use of chlorine, mixtures of chlorine with other relatively harmless gases, such as oxygen and carbon dioxide, are often produced. If the concentration of chlorine in these gases is relatively high the bulk of the chlorine can be removed by liquification of the chlorine. Removal of the remaining small concentrations of chlorine from the gas mixture was often accomplished by mixing the gases with carbon tetrachloride. The carbon tetrachloride would absorb the chlorine so that the remaining gases could be released to the atmosphere. Heating then released the chlorine from the carbon tetrachloride. However, this process resulted in small amounts of carbon tetrachloride being released to the atmosphere.

Under the Montreal Protocol, which went into effect in July of 1993, the use of carbon tetrachloride has been discouraged by heavy taxes and its use will be banned altogether in the future. In order to comply with these regulations it was necessary to find another suitable solvent that could absorb the chlorine. While there are a large number of solvents that are good chlorine absorbers, many of these solvents are not suitable for this type of application because they are toxic, flammable, too high boiling, too low boiling, corrosive, or react with the chlorine. Many of the solvents would require expensive modifications of the gas purification apparatus, such as increasing the heat duty, using larger equipment, or using a source of heat other than steam.

Carbon tetrachloride was also used to remove contaminants, such as nitrogen trichloride and high boiling compounds, from chlorine. The carbon tetrachloride was mixed with gaseous chlorine and the contaminants were absorbed into the carbon tetrachloride. Heating the mixture of carbon tetrachloride and contaminants resulted in the decomposition of the nitrogen trichloride. This application for carbon tetrachloride is also discouraged under the Montreal Protocol.

SUMMARY OF THE INVENTION

We have discovered that two chlorinated organic liquids, chloroform ($CHCl_3$) and ethylene dichloride (i.e., "EDC," 1,2-dichloroethane), are suitable replacement fluids for carbon tetrachloride in applications which involve the removal of contaminants from chlorine-containing gases, where the contaminant is either chlorine itself or some other substance. A remarkable aspect of these two chlorinated organic liquids is that they can be used in the same apparatus in which carbon tetrachloride had been previously used, without modification of that apparatus. Because modifying a chemical apparatus is so expensive these days, due to the many safety and environmental considerations that must be met, it is a major benefit to be able to use an alternative liquid without having to modify the apparatus.

One requirement for a solvent as a replacement fluid for carbon tetrachloride is that it must not react with chlorine. Initially, it was felt that chloroform would not meet this requirement because it is known that chloroform reacts with chlorine to form carbon tetrachloride according to the equation

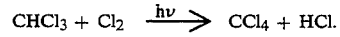

$$CHCl_3 + Cl_2 \xrightarrow{h\nu} CCl_4 + HCl.$$

The formation of carbon tetrachloride by that reaction would make chloroform unsuitable for this purpose because the generation of carbon tetrachloride would violate the Montreal Protocol. That reaction requires light, heat, or a catalyst. Because the chloroform would be heated in the apparatus to decompose nitrogen trichloride at about 58° C. and ferric chloride, a known catalyst for the chlorination of chloroform was present, the reaction was expected to occur. However, much to our surprise, the reaction of chloroform with chlorine to form carbon tetrachloride did not occur. In fact, after six weeks of testing chloroform as a substitute fluid for carbon tetrachloride, no detectable amount of carbon tetrachloride was found in the apparatus.

Similarly, it is known that chlorine and ethylene dichloride react to form various chlorinated ethanes, ultimately forming hexachloroethane according to the overall reaction $C_2H_4Cl_2 + 4Cl_2 \rightarrow C_2Cl_6 + 4HCl$. The formation of hexachloroethane is undesirable because it can plug up the system. Although ferric chloride was believed to retard the formation of these undesirable chlorinated ethanes, we found that oxygen is the primary or major inhibitor in the further chlorination of ethylene dichloride.

DESCRIPTION OF THE PREFERRED EMBODIMENTS

Figure 1:
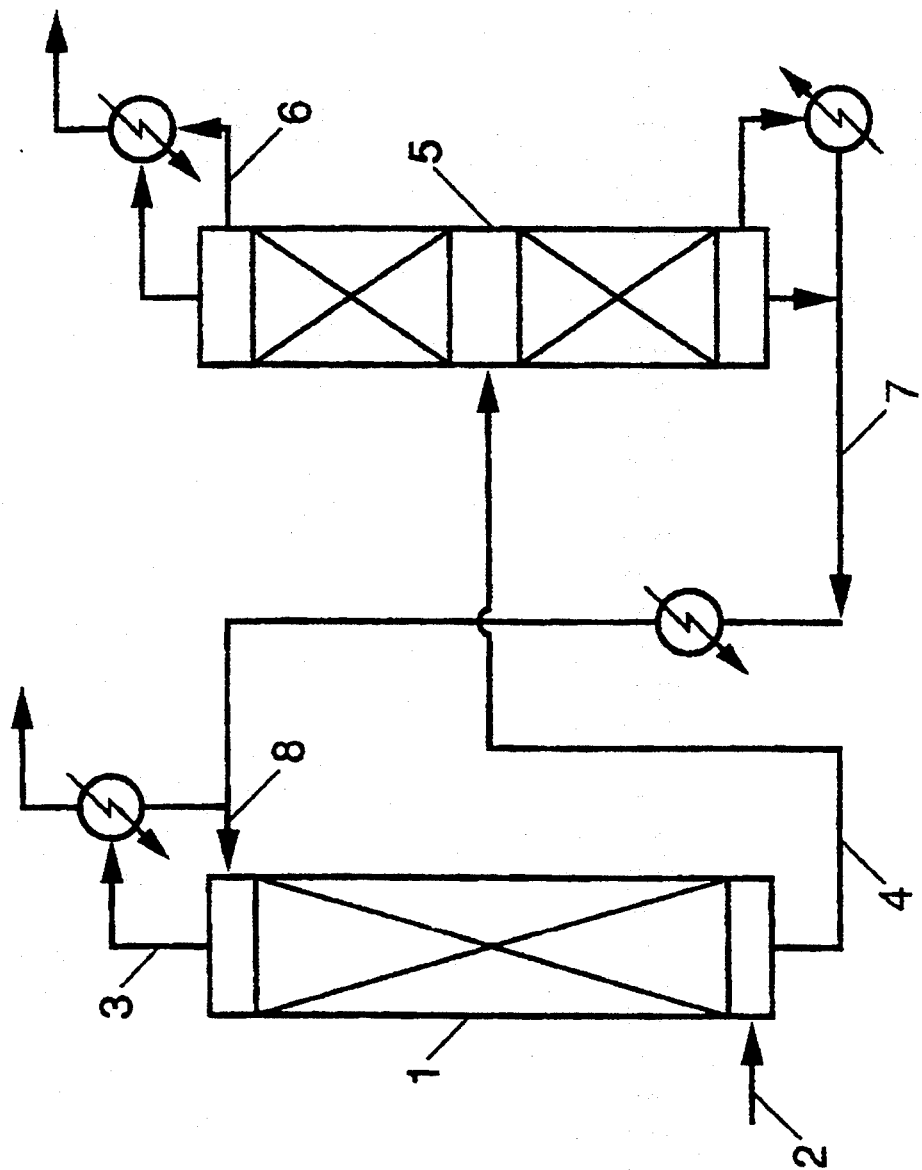
FIG. 1 is a diagram illustrating an apparatus suitable for removing small amounts of chlorine from air or other gases using carbon tetrachloride.

In FIG. 1, a snift gas containing chlorine and other gases enters the bottom of absorber column 1, through gas inlet 2. The snift gas passes up through the packing material (not shown) in the column (e.g., Berl saddles, rasaigh rings, etc.) where it encounters liquid chloroform or liquid ethylene dichloride. The intimate contact between the snift gas and the liquid results in the absorption of the chlorine in the snift gas by the liquid. The remaining snift gas leaves column 1 through gas outlet 3, and the liquid containing the absorbed chlorine leaves column 1 through liquid outlet 4, where it is transported to stripper 5. In stripper 5, the liquid is heated by means not shown to vaporize the chlorine absorbed in the liquid. The vaporized chlorine passes out chlorine outlet 6 where it is collected and recycled to the chlorine manufacturing plant. The liquid, stripped of its chlorine, leaves stripper 5 through liquid outlet 7 and is recycled to absorber 1 through liquid inlet 8.

Snift gases that can be treated using the process and apparatus of this invention may contain any amount of chlorine. However, if the snift gas contains more than about 60 wt % chlorine, it is generally more economical to remove most of the chlorine by cooling and compressing the gas to liquify the chlorine. Thus, a typical snift gas treated according to this invention will contain about 1 to about 45 wt % chlorine. Usually, the remainder of the gases in the snift gas contains oxygen, nitrogen, carbon dioxide, and hydrogen.

Figure 2:
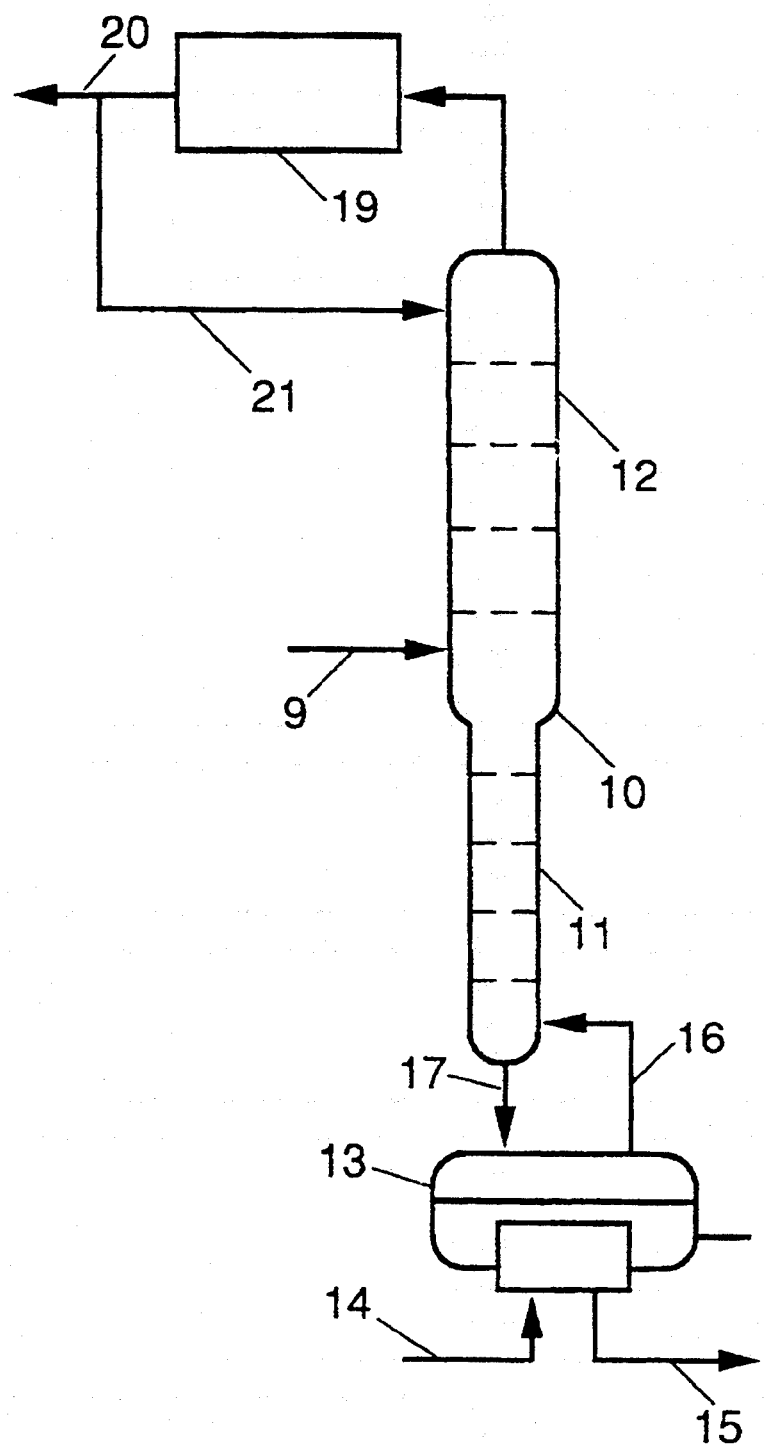
FIG. 2 is a diagram illustrating an apparatus suitable for removing nitrogen trichloride and higher boiling organic compounds from chlorine gas using carbon tetrachloride.

In FIG. 2, chlorine gas in line 9 contains small amounts, typically 10 to about 5,000 ppm, of nitrogen trichloride, which must be removed because it can explode if concentrated. Nitrogen trichloride can form because the brine from which chlorine is produced by electrolysis contains ammonium compounds which become chlorinated. The chlorine gas may also contain about 1 to about 10 ppm of higher boiling organic compounds, which are also desirably removed to enhance the purity of the product. Such chlorine is produced, for example, by the electrolysis of brine in membrane cells. Moisture is usually removed from this chlorine gas because wet chlorine is corrosive. Moisture removal can be accomplished by, for example, scrubbing with sulfuric acid.

The chlorine enters suction chiller 10 which consists of a stripping section 11 and a cooling section 12. The temperature in stripping section 11 is above the boiling point of chlorine but below the boiling point of chloroform or ethylene dichloride, and is typically about 40° to about 55° C. The temperature in cooling section 12 is about −30° to about 40° C.

Chloroform or ethylene dichloride in reboiler 13 is heated with steam which enters reboiler 13 in line 14 and leaves as condensate in line 15. Vapor from the heated chloroform or ethylene dichloride enters stripping section 11 of suction chiller 10 through line 16. In column 10, the chloroform or ethylene dichloride vapor intermixes with chlorine gas from line 9 and absorbs the nitrogen trichloride and higher boiling organic compounds. As the vapor rises into cooling section 12 it condenses and falls back into reboiler 13 through line 17. The temperature in reboiler 13 is typically maintained between 55° and 60° C. to decompose the nitrogen trichloride into nitrogen and chlorine which reenter suction chiller 10 through line 16. The higher boiling compounds accumulate in reboiler 13 and must be periodically removed.

The chlorine gas from line 9 proceeds up through cooling section 12 and exits the suction chiller 10 through line 18 where it is cooled and compressed to form liquid chlorine in compressor 19. A portion of the liquid chlorine output 20 of compressor 19 can be recycled through line 21 back to cooling section 12 of suction chiller 10. The liquid chlorine acts as a coolant and any remaining higher boiling organic compounds in the liquid chlorine can then be removed.

This invention is applicable to any type of gas purification apparatus that is suitable for using carbon tetrachloride to contact a chlorine-containing mixture of gases to remove chlorine or another gas from the mixture. Examples of such apparatus include those described in FIGS. 1 and 2. Such apparatus will have been built so as to operate efficiently using a liquid having the physical and chemical properties of carbon tetrachloride. Such properties include a boiling point of 76.7° C., solubility of the gas to be removed in the liquid, and the corrosiveness or toxicity of the liquid. The usefulness of this invention lies in replacing the carbon tetrachloride with chloroform or ethylene dichloride without the necessity of having to alter the gas purification apparatus. Nevertheless, the apparatus will still perform as efficiently in removing the contaminant from the chlorine containing gas.

The following examples further illustrate this invention.

Example 1

Figure 3:
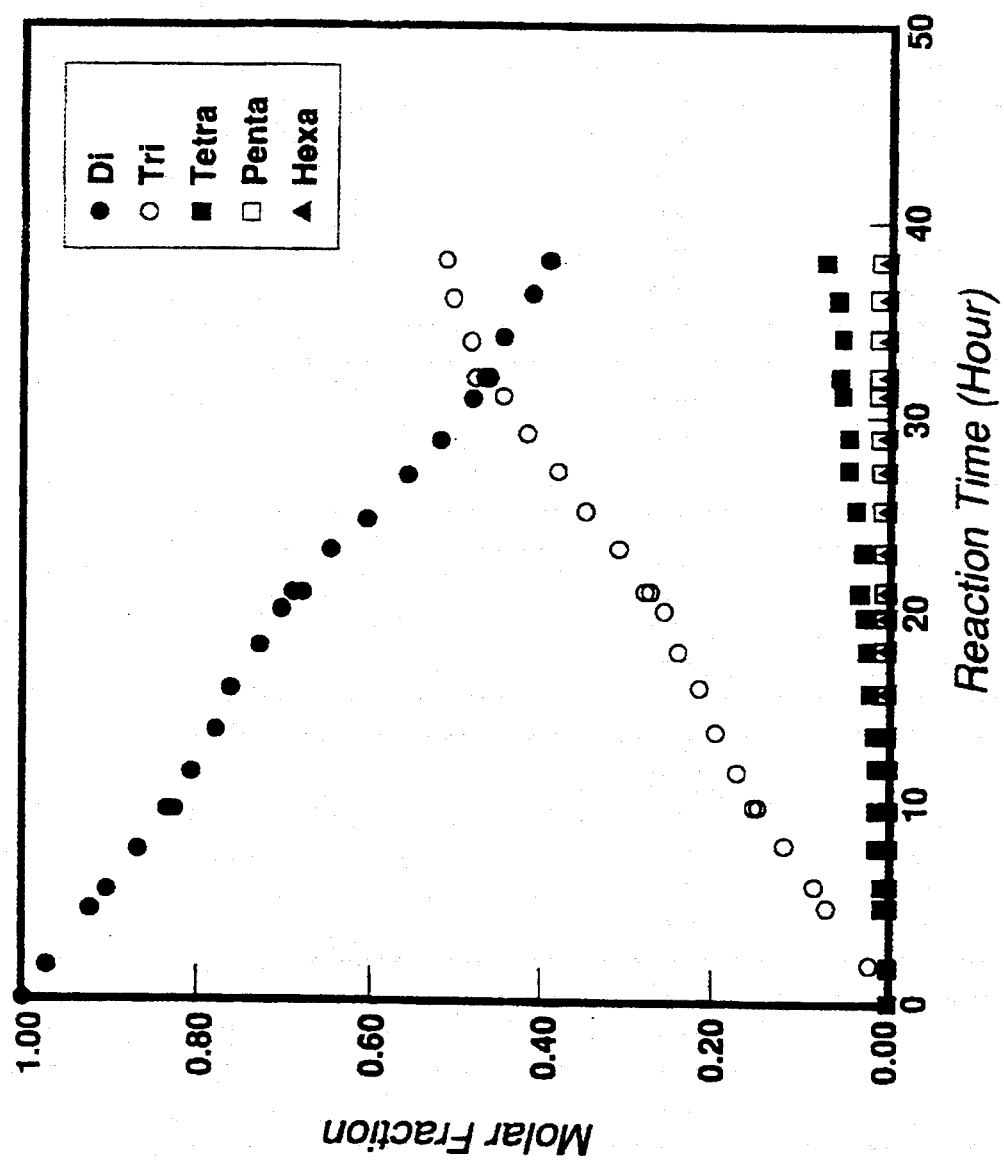
FIGS. 3, 4, and 5 are graphs, explained in Example 1, which show the percent conversion of ethylene dichloride to higher chlorinated species under various conditions.

Into a 500 ml glass flask (covered to prevent photoinitiation) was charged 150 mls of pure 1,2-dichloroethane. Chlorine gas was continuously added to the reactor at a flow rate of 25.8 ml/min at 1 atm of pressure. The reaction temperature was controlled at 70° C. Samples were taken every hour and analyzed for chlorinated $C_2$ compounds by gas chromatography. The effects of ferric chloride ($FeCl_3$) and oxygen were also tested. The experimental results are given in FIGS. 3, 4, and 5. In FIG. 3, 500 ppm of ferric chloride was present but oxygen was not present. FIG. 3 shows that the ferric chloride catalyzed the formation of trichloroethane as well as smaller amounts of tetra, penta, and hexachloroethane.

Figure 4:
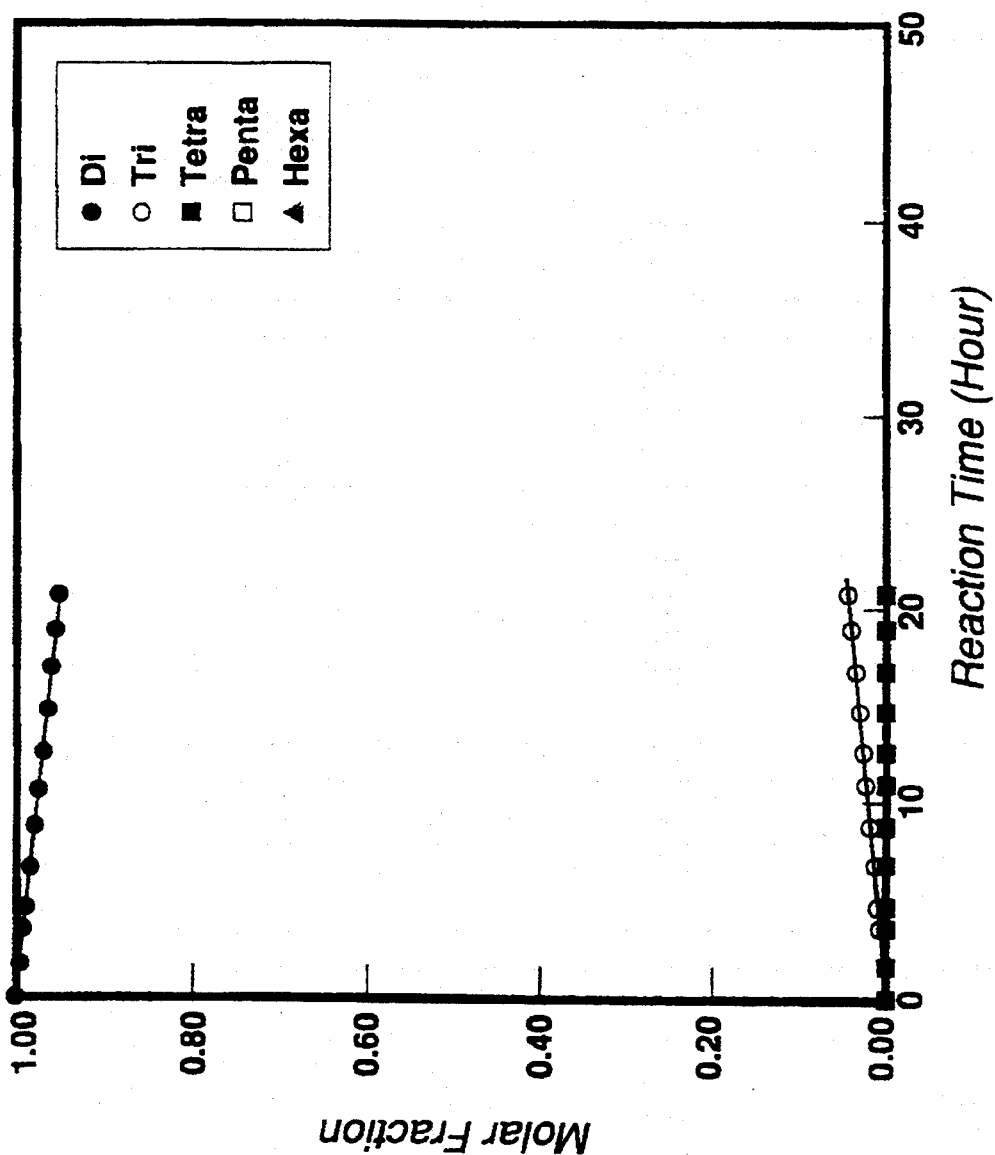

In FIG. 4, 8 ml/min of air was present but ferric chloride was not present. FIG. 4 shows that only a small amount of 1,2-dichloroethane was converted into trichloroethane.

Figure 5:
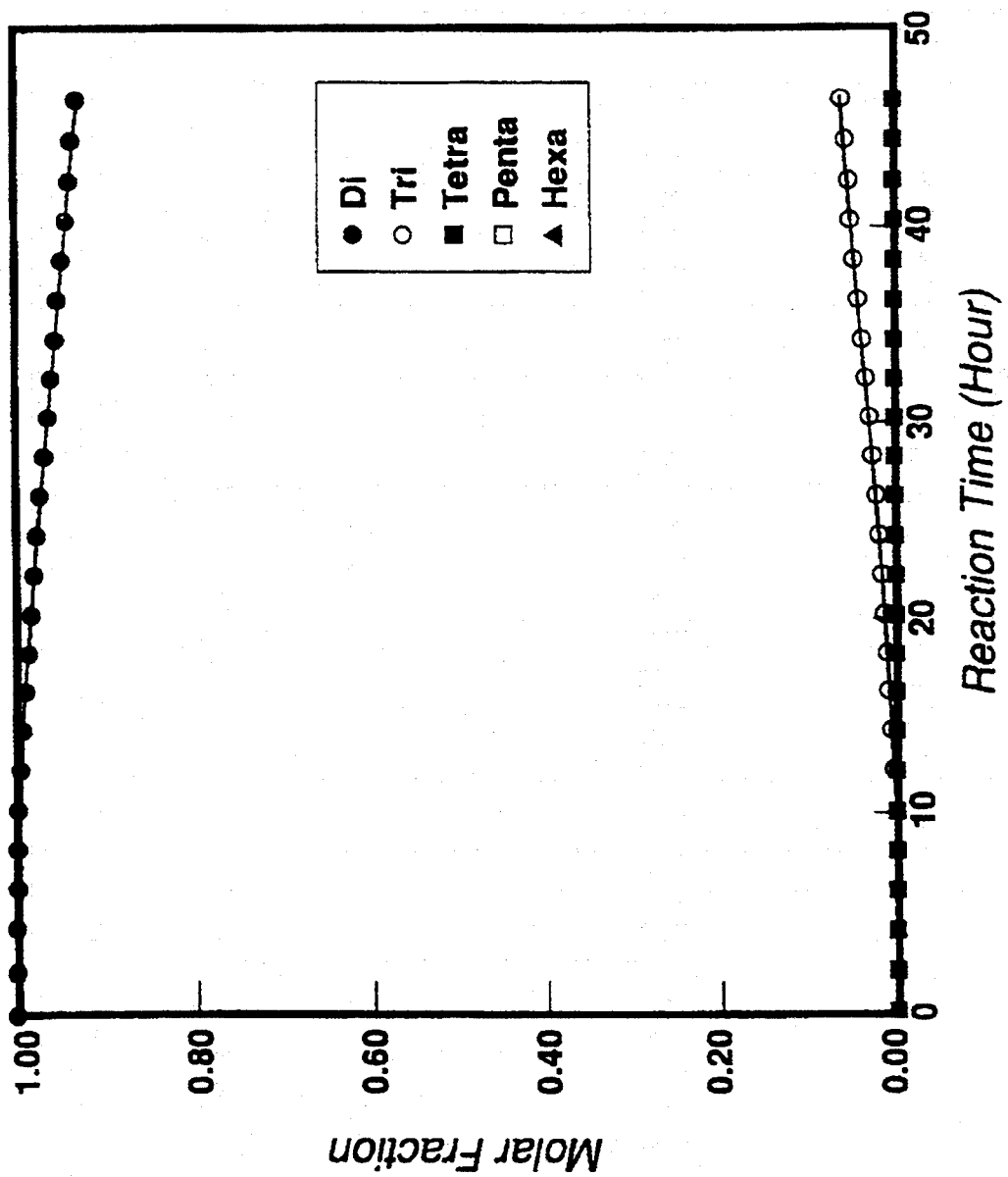

In FIG. 5, both 500 ppm of ferric chloride and 8 ml/min of air were present. Based on the results given in FIGS. 3 and 4, one would have expected a large amount of the ethylene dichloride to be converted into trichloroethane. Surprisingly, however, the amount of ethylene dichloride converted into trichloroethane was actually less than the amount converted when either air or ferric chloride was used alone. Thus, when air and ferric chloride are used together they seem to inhibit the reaction of ethylene dichloride and chlorine to form higher chlorinated species. Since both ferric chloride and air are often present in gas purification processes that involve carbon tetrachloride, this unexpected inhibiting effect demonstrates that ethylene dichloride is a suitable replacement fluid for carbon tetrachloride.

Example 2

At a commercial plant for the production of chlorine and caustic by the electrolysis of water, the chlorine produced, after drying over sulfuric acid, was sent to a reboiler (as shown in FIG. 2) which was operated using carbon tetrachloride. This chlorine contained about 2 ppm of nitrogen trichloride, about 6 ppm of ferric chloride and had been exposed to air. The carbon tetrachloride was progressively replaced with chloroform over a five-day period and the temperature of the reboiler was reduced from 68° to 55° C. (The boiling point of chloroform is 61° C.) After five days, the reboiler was operated entirely with chloroform. After over six weeks of operation, the conversion rate of chloroform to carbon tetrachloride was found to be almost zero. No unexpected exotherms were observed when carbon tetrachloride was replaced with chloroform. The concentration of nitrogen trichloride in the product, based on the Kjeldahl method, varied between 800 and 5,000 ppm, considered to be a safe level, while the organic levels in the product remained at less than 10 ppm.

I claim:

1. In a gas purification apparatus suitable for purifying a mixture of chlorine gas and nitrogen trichloride gas by contacting said mixture with carbon tetrachloride in order to remove said nitrogen trichloride gas from said mixture, a method of performing said removal in said same apparatus without using carbon tetrachloride comprising the steps of (A) replacing said carbon tetrachloride in said apparatus with a chlorinated organic liquid selected from the group consisting of chloroform and 1,2-dichloroethane;

(B) mixing said chlorinated organic liquid with said mixture, whereby said chlorinated organic liquid absorbs nitrogen trichloride in said mixture; and (C) separating said chlorinated organic liquid from said mixture.

2. A method according to claim 1 wherein said chlorinated organic liquid is mixed with said mixture in a suction chiller, where the upper portion of said suction chiller is maintained at a temperature between the boiling point of chlorine and the boiling point of said chlorinated organic liquid, so that said chlorine leaves said suction chiller at the top of said suction chiller while said chlorinated organic liquid falls to the bottom of said suction chiller.

3. A method according to claim 1 wherein said chlorinated organic liquid is chloroform.

4. A method according to claim 1 wherein said chlorinated organic liquid is 1,2-dichloroethane.

5. A method according to claim 1 wherein, after step (C), said nitrogen trichloride in said chlorinated organic liquid is destroyed by heating said chlorinated organic liquid to a temperature between about 55° and about 60° C.

6. A method according to claim 2 wherein the temperature in the lower portion of said suction chiller is about 40° to about 55° C. and the temperature in the upper portion of said suction chiller is about −30° to about 40° C.

7. A method according to claim 1 wherein the amount of said nitrogen trichloride in said mixture is about 10 to about 5000 ppm.

8. A method according to claim 1 wherein said mixture also contains about 1 to about 10 ppm of higher boiling organic compounds.

9. In an apparatus suitable for removing nitrogen trichloride from moisture-free chlorine gas by mixing said chlorine gas with carbon tetrachloride vapors in a suction chiller having a temperature in its upper portion between the boiling point of chlorine and the boiling point of carbon tetrachloride, whereby chlorine vapor leaves the top of said suction chiller and carbon tetrachloride containing nitrogen trichloride falls to the bottom of said suction chiller where said nitrogen trichloride is decomposed with heat into nitrogen and chlorine, a method of removing nitrogen trichloride from moisture-free chlorine gas in said same apparatus without using carbon tetrachloride comprising (A) mixing said chlorine gas in said suction chiller with vapors of a chlorinated organic liquid selected from the group consisting of chloroform and 1,2-dichloroethane; and (B) operating said apparatus at a temperature in said upper portion of said suction chiller between the boiling point of chlorine and the boiling point of said chlorinated organic liquid.

10. A method according to claim 9 wherein said chlorinated organic liquid is chloroform.

11. A method according to claim 9 wherein said chlorinated organic liquid is 1,2-dichloroethane.

12. A method according to claim 9 wherein the temperature in the lower portion of said suction chiller is about 40° to about 55° C. and the temperature in the upper portion of said suction chiller is about −30° to about 40° C.

13. A method according to claim 9 wherein the amount of said nitrogen trichloride in said chlorine is about 10 to about 5000 ppm.

14. A method according to claim 9 wherein said chlorine also contains about 1 to about 10 ppm of higher boiling organic compounds.

15. A method according to claim 9 wherein said chlorinated organic liquid in said suction chiller falls into a reboiler at the bottom of said suction chiller, including heating said reboiler to a temperature between about 55° and about 60° C. to decompose nitrogen trichloride therein.

16. A method according to claim 2 including making said chlorine moisture-free by scrubbing with sulfuric acid.

17. A method according to claim 9 including making said chlorine moisture-free by scrubbing with sulfuric acid.

* * * * *